United States Patent [19]

Long

[11] Patent Number: 4,509,197
[45] Date of Patent: Apr. 2, 1985

[54] WINDOW BAG FOR LIQUIDS

[75] Inventor: Florren E. Long, Mount Vernon, Ohio

[73] Assignee: Ludlow Corporation, Needham Heights, Mass.

[21] Appl. No.: 427,190

[22] Filed: Sep. 29, 1982

[51] Int. Cl.³ .............................................. B65D 33/04
[52] U.S. Cl. ..................................... 383/106; 383/113
[58] Field of Search ............... 383/106, 113, 107; 206/438, 439, 484, 484.2, 524.2, 524.6; 229/3.5 MF

[56] References Cited

U.S. PATENT DOCUMENTS

| | | | |
|---|---|---|---|
| 1,814,967 | 7/1931 | Royal | 383/106 |
| 2,750,096 | 6/1956 | Misch | 229/17 G |
| 2,752,085 | 6/1956 | Bryce | 383/106 |
| 3,386,645 | 6/1968 | Powell | 383/106 |
| 3,387,640 | 6/1968 | Butler | 383/106 |
| 3,759,379 | 9/1973 | Wrede | 206/484 |
| 3,938,659 | 2/1976 | Wardwell | 206/439 |
| 3,967,728 | 7/1976 | Gordon et al. | 206/484 |
| 4,267,960 | 5/1981 | Lind et al. | 383/106 |

FOREIGN PATENT DOCUMENTS 2539351 10/1977 Fed. Rep. of Germany .
2046703 11/1980 United Kingdom ............ 206/484

Primary Examiner—Stephen P. Garbe
Attorney, Agent, or Firm—David G. Conlin

[57] ABSTRACT

A novel heat-sealed and heat-sterilizable construction with an opaque member readily peelable to provide a view of the contents of the bag.

9 Claims, 4 Drawing Figures

U.S. Patent     Apr. 2, 1985     4,509,197
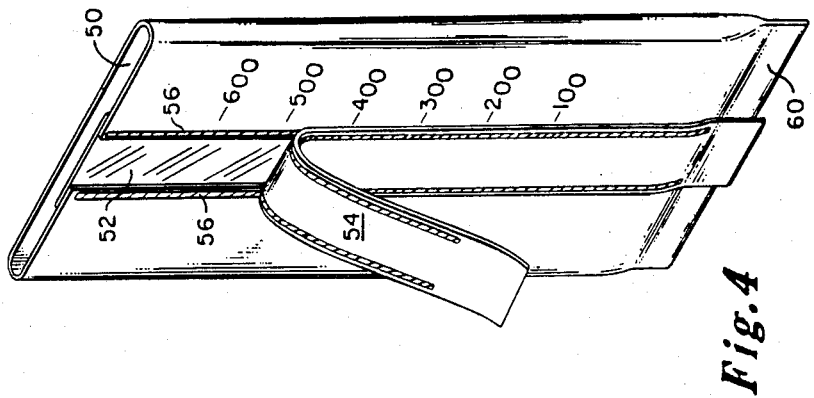
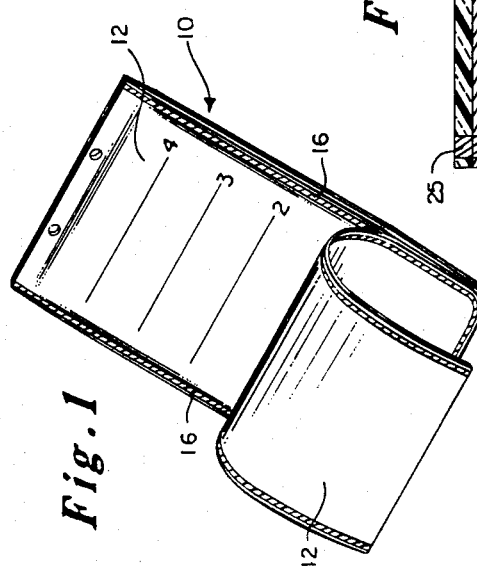
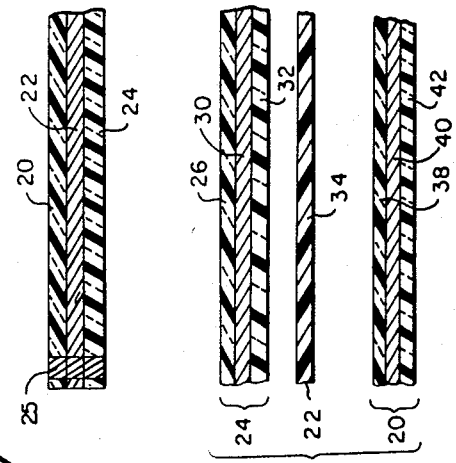

WINDOW BAG FOR LIQUIDS

BACKGROUND OF THE INVENTION

This invention relates to providing a bag of heat-sealable construction which comprises at least one ply of an opaque barrier sheet peelable from the remaining structure, preferably to allow viewing of the contents of the bag. The bag is characterized by good strength and the fact that it can be thermally sterilized without substantially interfering with the heat-seal.

Window-type constructions on plastic packages are known in the prior art. For example, such constructions are disclosed in German Offenlegungsschrift 25 39 351. A somewhat similar construction is shown in U.S. Pat. No. 4,015,771.

It has remained a problem to provide a thermally-sterilized bag with a peelable window construction that is desirably strong. In some instances it may be desirable for such a bag to withstand a six-foot drop to a floor while containing a liter of liquid. To provide such a bag while, at the same time, providing a peelable, window-revealing member in the construction is a problem to which the invention is directed.

SUMMARY OF THE INVENTION

It is a principal object of the invention to provide a flexible package for liquid which comprises a peelable layer to make the contents of the package visible.

It is a further object of the invention to provide a package for liquid which may be sterilized by heat without harming the peelable seal.

A further object of the invention is to provide a package with the attributes described above, but one that can withstand, while containing a liter of liquid such as water, a six-foot drop to a concrete floor without breaking.

Other objects of the invention will be obvious to those skilled in the art on their reading of this disclosure.

The above objects have been substantially achieved by constructing a heat-sealable pouch comprising a poly- olefin-based interior bag and, a heat-sealed, but peelable, window structure which is an opaque, gas-barrier (usually of the type bearing a metal-foil ply) but which is removable from said polyolefin bag with a peel strength of about 1000 grams per inch or less.

Preferred polyolefins are those which are modified to have relatively high impact strength. However, the principal object of the invention can be achieved utilizing polypropylene or any other polyolefin film which can be suitably processed, i.e., heat sterilized, for a period of time at a temperature of 250° to 275° F. to sterilize the contents of a package. The most advantageous olefin polymer films are those modified with copolymers or polyisobutylene, or other such impact-strength-improving polymers, such that the impact strength of the composite material is improved to the point that the liquid will be retained even when a package containing about a liter of liquid is dropped six feet onto a concrete floor. A particularly favorable film in view of its strength and heat-sealing characteristics is a blend of polypropylene and polyisobutylene. Such a blend suitably contains from about 10 to 60, by percent, of polyisobutylene. About 30 to 50 weight percent of polyisobutylene in polypropylene is a preferred composition.

The heat-seal by which the removable window is affixed to the polyolefin film has a number of important attributes. Not only must it withstand the heat treatment of sterilization, but it must do so with little effect on its peel strength. Advantageously, this effect on its peel strength should be less than 20%. In the context of this Application, the ability to be heat-sterilized assumes that the peel strength will not be affected by as much as 20% by the 250° to 275° F. sterilizing temperature. Moreover, the peel strength should be within the range of about 600 to 1600 grams per lineal inch, depending on the application. Bags made according to the invention are particularly useful for IV's and other pharmaceutical liquids.

This heat-seal has been dependably achieved by heat-sealing, to the polyolefin or to the modified polyolefin, a modified maleic anhydride adduct of polyolefin.

The modified polyolefin-based composition which is heat-sealed to said transparent panel is such that it, after heat-sterilizing at 250° F. to 270° F., has a peel strength of from 600 to 1600 grams per linear inch of width of the heat-seal. The heat-seal itself is normally about 0.25 to 0.4 inch wide.

ILLUSTRATIVE EXAMPLE OF THE INVENTION

In the application and accompanying drawings, there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, depending upon the particular case.

FIG. 1 is a perspective view of a pouch formed according to the invention.

FIG. 2 illustrates, schematically and in section, a package formed according to the process of the invention.

FIG. 3 illustrates the plys of FIG. 2, schematically but in more detail.

FIG. 4 is a perspective view of another pouch formed according to the invention.

Referring to FIG. 1, it is seen that a bag 10 comprising an intravenous solution 12 is shown with one panel 14 partly peeled away along heat-sealed line 16, thereby revealing solution 12.

FIG. 2 shows, schematically and in section, a typical pouch construction useful in forming the package of the invention. The pouch is formed of three basic panels:
an opaque barrier back panel 20;
a transparent front panel 22;
an opaque, peelable barrier panel 24.
All of the panels 20, 22, and 24 are heat-sealed along the edges 25 thereof to form a pouch. As is well known in the art, the final closing of the pouch is carried out only after filling and by heat-sealing (or otherwise sealing) a fill opening, which is not shown in the drawings, but which opening will be well understood by those skilled in the art.

Peelable panel 24 comprises a biaxially-oriented film ply 26, e.g., of the type sold under the trade designation MYLAR, which is 0.00048 inch thick. This ply is coated with about one pound per 1000 square feet of an adhesive such as the thermosetting adhesive 28 sold under the trade designation 506 by Morton Chemicals Co. The adhesive-coated surface of the polyester is bonded to one side of an aluminum foil 30 of 0.0010 inch thickness. The opposite side of the foil is coated with 0.2 to 0.8 pounds per 1,000 square feet of a modified maleic anhydride adduct of polypropylene 32, which is sold under the trade designation Morprime by Morton Chemical, and which provides the desirable peelable heat seal to a polypropylene layer, 34. Layer 34 constitutes panel 22, is about 0.004 inch thick, and is formed of a polypropylene (or a polyisobutylene blend, as described above, having a nominal molecular weight of from about 80,000 to 140,000). Materials sold under the trade designation Vistanex by Exxon are suitable (with those of about 100,000 to 120,000 being preferred).

Opaque panel 20, which is to be permanently heat-sealed to transparent panel 22, is formed of a polyester-/aluminum foil/polypropylene sheet, for example, a 0.004 inch thick polypropylene layer 38 is bonded to the 0.0007 inch thick aluminum foil 40, and the 0.00048 inch thick polyester 42 is an exterior ply.

When the heat sealing of the pouch perimeter takes place, polypropylene panel 22 will bond to the polypropylene 38 of ply 20 with a seal strength of over 2,000 grams per linear inch of seal width. However, panel 24 will be bonded to panel 22 with a peel strength of only about 800 grams per inch. Therefore, panel 24 can be readily and selectively peeled from the package when it is ready for use so that the solution will be visible.

In practice, it is desirable to have indicia printed on the external side of polypropylene 22 as shown in FIG. 1. (However, the indicia could be printed on other external surfaces such as polyester 42 on the polymer film facing polyester 42.

In another embodiment of the invention, about 50% of polyisobutylene (sold by Exxon Inc. under the trade designation Vistanex L100) is blended in a Banbury mixer with about 50% of polypropylene. A film is extruded therefrom and used as a replacement for polypropylene in plys 22 and 24. Again, excellent peelability is achieved. Moreover, when a one-liter package is dropped from 6 feet onto a concrete floor, there is no rupture.

In still another embodiment of the invention, the polyisobutylene blend is reduced to about 20%. Again, a package is formed having substantially greater resistance to falling than does the package with unblended polypropylene.

FIG. 4 shows another pouch using the improved window-seal aspect of the invention.

In this aspect of the invention, there is a wraparound construction whereby the first and second opaque barrier layers of the embodiment of FIGS. 1 and 2 are formed of a single laminate 50. A relatively narrow window ply 52 is sealed on the interior bag wall formed of sheet 50. A peelable window strip 54 is fixed to the lateral perimeter 56 of the laminate 50 using the 50%-polyisobutylene peelable seal. It is also possible to modify this structure by sealing directly to the lateral areas of the polypropylene window. However, it is believed to be desirable to place a thin coating of polypropylene over the 0.0048 inch thick polyester of laminate 50 to obtain good bonding to laminate 50 of the window strip 54.

This configuration is heat-sealed as at 60, as desired for a particular application, to yield strong polypropylene heat seals.

The term "opaque barrier ply" in this application defines metal-foil-bearing laminates together with at least one polymeric coating such as polyester or polypropylene thereover.

It will be understood that a dual-window container can be made by replacing a unitary barrier layer with a readily-peelable, 2-ply construction comprising a polyolefin window ply and a peelable barrier layer adhering to the window ply.

Also, it is noted that the "periphery" of the plys which form the pouch will not in every case correspond directly to the periphery of the entire pouch assembly. In many cases, some additional extension of the plys beyond the pouch itself is desirable to provide material by which to suspend or otherwise handle the pouch.

It is also to be understood that the following claims are intended to cover all of the generic and specific features of the invention herein described and all statements of the scope of the invention which might be said to fall therebetween.

What is claimed is:

1. A heat-sterilizable flexible pouch suitable for use in retort packaging, said pouch comprising:
   (a) a first opaque barrier ply, heat-sealed about its periphery to
   (b) a first side of a transparent window ply, which is in turn heat-sealed about its periphery on its second side to
   (c) a second opaque barrier ply and wherein the minimum seal strength of the seal between (a) and (b) is over about 2000 grams per inch and the maximum peel strength of the seal between plys (b) and (c) is below the seal strength between (a) and (b).

2. A pouch as defined in claim 1 wherein the heat-seal between (b) and (c) is made by heat-sealing (b) to a modified maleic anhydride adduct of polypropylene coated on (c).

3. A heat-sterilizable pouch as defined in claim 1 wherein the seal strength between plys (a) and (b) is at least three times the peel strength between (b) and (c) and the peel strength between (b) and (c) is about 600 to 1600 grams per inch.

4. A pouch as defined in claim 3 wherein the heat seal between (b) and (c) is made by heat-sealing (b) to a modified maleic anhydride adduct of polypropylene coated on (c).

5. A pouch as defined in claims 1, 2, or 3 wherein said ply (b) is formed of a blend of polypropylene and polyisobutylene.

6. A pouch defined as in claim 2 wherein the heat seal between (b) and (c) is formed between a blend of polypropylene and polyisobutylene as ply (b) and a modified maleic anhydride adduct of polypropylene coated on (c).

7. A pouch as defined in claim 6 wherein said polyisobutylene has a nominal molecular weight of from about 100,000 to 120,000.

8. A pouch as defined in claim 1, 2, or 6 wherein the pouch comprises indicia on the structure of said transparent window ply.

9. A heat-sterilizable flexible pouch suitable for packaging liquids, said pouch being formed of (i) a laminate comprising:
   (a) polypropylene interior ply;
   (b) an aluminum foil as an opaque barrier layer; and
   (c) a biaxially-oriented, polyester sheet,
(ii) a strip of polypropylene adhered to lateral edges of such laminate to form a tubular shaped package, and
(iii) a strip of aluminum foil peelably sealed to the pouch proximate said lateral edges of such strip.

* * * * *